United States Patent
Wyld

(10) Patent No.: US 7,073,089 B2
(45) Date of Patent: Jul. 4, 2006

(54) EXTERNAL FAULT TOLERANT SHARED MEMORY UNIT IN A DISTRIBUTED MULTIPROCESSING SYSTEM

(75) Inventor: Brian Wyld, Brignoud (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 611 days.

(21) Appl. No.: 09/755,283

(22) Filed: Jan. 8, 2001

(65) Prior Publication Data

US 2002/0053041 A1    May 2, 2002

(30) Foreign Application Priority Data

Oct. 31, 2000    (EP) ................................ 00410133

(51) Int. Cl.
*G06F 11/16* (2006.01)

(52) U.S. Cl. .............................. 714/6; 714/5; 709/213; 711/147

(58) Field of Classification Search ................... 714/5, 714/6; 709/211, 213, 214, 215, 216, 253; 711/147, 148, 149
See application file for complete search history.

(56) References Cited

U.S. PATENT DOCUMENTS

| 4,590,551 A | | 5/1986 | Mathews ...................... 364/200 |
|---|---|---|---|
| 4,780,812 A | * | 10/1988 | Freestone et al. ............ 711/149 |
| 5,379,415 A | * | 1/1995 | Papenberg et al. ............. 714/5 |
| 5,408,627 A | * | 4/1995 | Stirk et al. ................... 711/151 |
| 5,625,795 A | * | 4/1997 | Sakakura et al. ........... 711/148 |
| 6,125,431 A | * | 9/2000 | Kobayashi ................... 711/154 |
| 6,148,377 A | * | 11/2000 | Carter et al. ................ 711/147 |
| 6,295,585 B1 | * | 9/2001 | Gillett et al. ................ 711/148 |
| 6,625,750 B1 | * | 9/2003 | Duso et al. .................... 714/11 |
| 6,675,316 B1 | * | 1/2004 | Harper ........................... 714/4 |

* cited by examiner

*Primary Examiner*—Robert Beausoliel
*Assistant Examiner*—Joseph D Manoskey
(74) *Attorney, Agent, or Firm*—Foley & Lardner LLP

(57) ABSTRACT

A distributed multiprocessing system, comprises several hosts connected to a network. Each host has a processing unit and internal memory accessed by the processing unit. In addition, each host further has an access device connected to a fault tolerant external memory unit by a fast connection. Each processing unit accesses the external memory unit transparently. The processing units of the distributed multiprocessing system thus share the same view of the external memory unit. This makes it possible to use symmetric multiprocessing memory sharing mechanisms, in a distributed multiprocessing system, due to the reduction of latency overheads by 4 or 5 orders of magnitude compared with standard DMP interconnect methods.

10 Claims, 2 Drawing Sheets

EXTERNAL FAULT TOLERANT SHARED MEMORY UNIT IN A DISTRIBUTED MULTIPROCESSING SYSTEM

BACKGROUND OF THE INVENTION

1. Field of the Invention

The invention relates to multiprocessing systems, and more specifically to fault tolerant distributed multiprocessing systems.

2. Description of the Related Art

In multiprocessing systems, work is shared between several processors, which simultaneously execute part of the work. It is thus necessary for all processors to communicate, e.g. for sharing work and reporting as to the work carried out. Multiprocessing systems are notably used for providing fault tolerance, that is allow the system to continue operating despite hardware failures.

There are basically two types of multiprocessing systems, that is symmetric multiprocessing systems (SMP systems) and distributed multiprocessing systems (DMP systems). In symmetric multiprocessing systems, several processors are provided in the same machine: they share the same memory devices and the same I/O devices. Since all processors thus work in the same environment, or at least share the same view of their environment, the operating system common to all processors shares work between the processor. In SMP systems, shared memory is a way to rapidly exchange data between instances; sharing memory in these systems is a relatively easy task, since all processors work in the same environment—and thus see the same memory devices. All processors being in the same machine have a fast access to the memory devices; in this context, fast access is representative of the speed at which the processor may access local memory, e.g. over a bus; current communication latency between a processor and its memory reaches tens of nanoseconds. The problem with SMP is that making the machine fault tolerant is difficult: duplicating the machine is not a satisfactory solution in terms of costs, if one of the machines is supposed to be on standby while the other one is active. Another problem is that making a SMP machine work satisfactorily is difficult when the number of processors is increased to more than 4 or 8 processors: it requires extensive hardware expertise to arbitrate between processors.

In distributed multiprocessing systems (or clustering), a number of separate machines or hosts are connected through a local area network or another kind of network. This makes it much easier to make the system fault tolerant—since the failure of one machine does not have any direct consequence on the hardware of another machine. The problem in DMP systems is to communicate between processors; indeed, the processors communicate over the network: latency of communication between processors is several orders of magnitude higher than in a SMP system; indeed, the speed of communication over a local area network is several orders of magnitude higher than the speed at which a processor may access memory located within the same machine.

U.S. Pat. No. 4,590,551 discusses a dual-ported memory for a data communication network support processor. A dual set of memory control circuit cards is provided, one of the cards servicing a master processor, while the other one services a slave processor. Each memory control circuit card provides a local memory for its processor, and further provides local access logic circuitry for allowing the processor to access an external shared memory. This system provides a means for a master processor and a slave processor to share memory; however, the master and slave processors do not form a distributed multiprocessing system.

BRIEF SUMMARY OF THE INVENTION

The problem of the invention is therefore to improve the operation of DMP systems, and more specifically the communication between processors of a DMP system.

For solving this problem, the invention suggests using an external memory unit, which processors of the DMP system may access, at a speed higher than the speed of the network. This makes it possible to use in a DMP system memory sharing mechanisms developed for SMP systems in order to exchange information between processor.

More specifically, the invention provides a distributed multiprocessing system, comprising at least two hosts connected to a network, each host having a processing unit and internal memory accessed by said processing unit; a fault-tolerant external memory unit, wherein each host further comprises an access device connected to said external memory unit, said device providing the processing unit of the host with a transparent access to said external memory unit.

BRIEF DESCRIPTION OF THE DRAWINGS

A multiprocessing system embodying the invention will now be described, by way of non-limiting example, and in reference to the accompanying drawings, where.

DETAILED DESCRIPTION OF THE EXEMPLARY EMBODIMENTS

Figure 1:
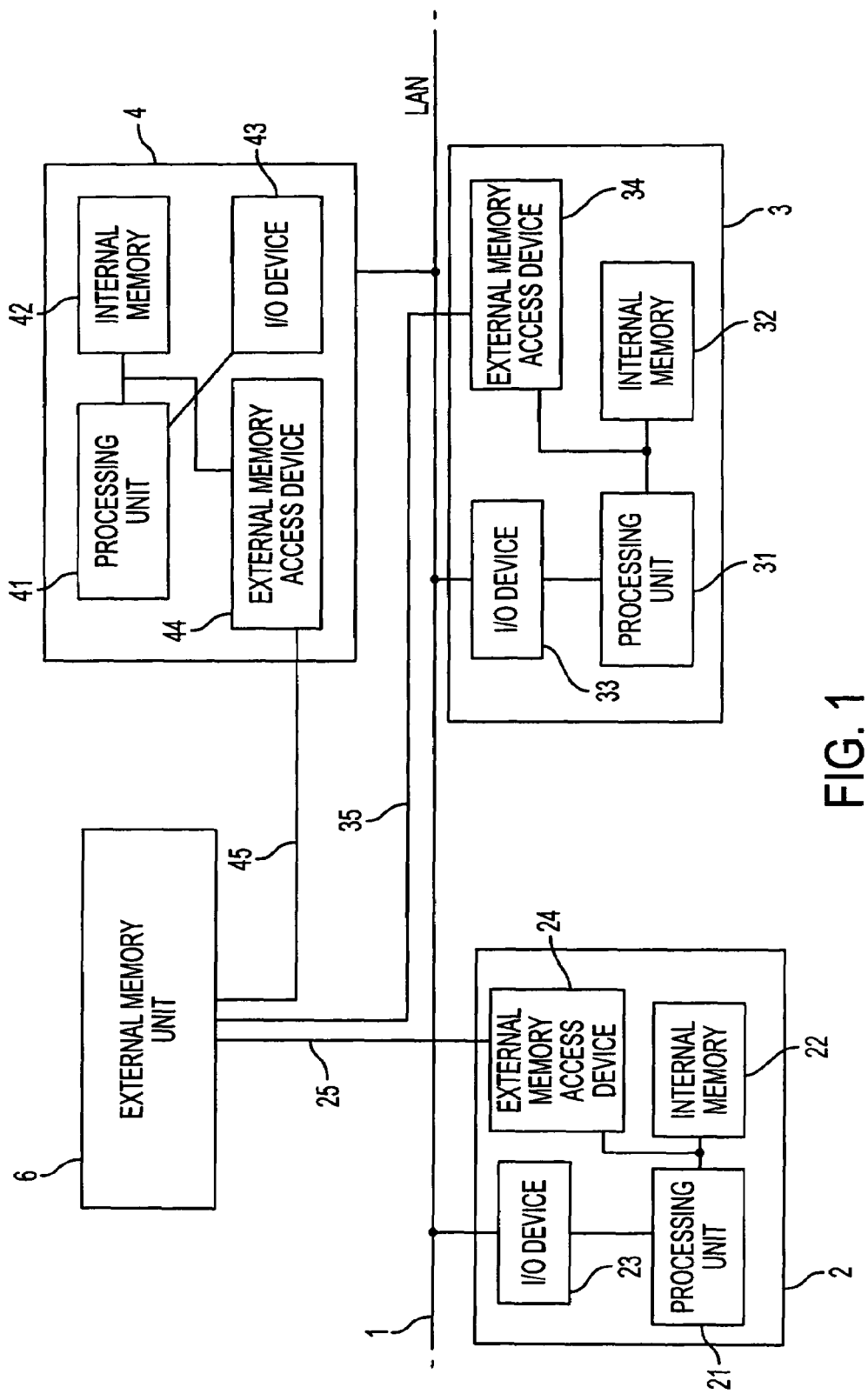
FIG. 1 is a schematic view of a multiprocessing system embodying the invention.

The invention is now discussed in reference to an embodiment of a distributed multiprocessing system. The system comprises a network 1, e.g. a local area network, onto which several machines 2, 3 and 4 are connected. Each machine has a processing unit 21, 31 and 41, associated with memory devices 22, 32 and 42. In the rest of this specification, the memory device installed in a machine is called "internal" memory, as opposed to memory located outside of the machine. Access to the internal memory by a processing unit is carried out by a bus or the like. Each machine further comprises an I/O device 23, 33 and 43 connected to the processing unit for communicating over the network with the other machines of the distributed multiprocessing system. Typical communication latency between two machines of the distributed multiprocessing system is around several milliseconds.

The operation of the system may use any method known per se in this field of the art, to ensure the sharing of work between the processing units of the different machines, and the reporting of all machines as regards the work carried out. One may provide additional elements in the system, such as I/O devices or the like connected to the network and accessed by all machines.

The system of FIG. 1 further comprises an external memory unit 6. The memory unit is "external" inasmuch as it is not part of any of the machines; more specifically, the memory unit may not be accessed by the processing units of the machines as internal memory, e.g. over a local bus. It is of course possible to locate the external memory unit in one of the machines, e.g. for using the same housing or the same power unit: however, this does not make the memory unit "internal".

For accessing the external memory unit 6, an access device 24, 34 and 44 is provided in each of the machines. The access device of a machine is connected to the processing unit of this machine, on the same type of connection as the internal memory. In the simplest configuration, the access device is connected to the same bus as the internal memory.

Furthermore, the access device of a machine is connected to the external memory unit, as shown at 25, 35 or 45 in FIG. 1; one may use any connecting means allowing fast access to the external memory unit, such as optical fibre in a parallel set, over a limited distance; in this respect, access speed is "fast" as compared to the speed on the network connecting the different machines of the DMP system. Latency of communication between the access device of a machine and the external memory unit may be characterized as a function of a bus cycle of the machine; it is preferable that non-contested memory location accesses be serviced in the time of a single machine bus cycle; this avoids any latency overhead due to the external nature of the memory unit when compared with the latency between a processor and associated local memory. Typically, the bus cycle of a machine could have a duration of 125 ns; access to the external memory unit 6 should preferably be carried out in this duration, at least for non-contested location accesses, that is accesses to a location of the external memory unit not accessed at the same time by another machine of the distributed multiprocessing system. Latency of communication may be nonetheless up to 2 or 3 orders of magnitude greater than the bus cycle time, and still be greater than 5 orders of magnitude smaller than the latency of communication over the network. Such improvement in latency allows standard SMP inter-processing programming mechanisms to operate without change.

The external memory access device provides to its processor transparent access to the external memory. Access is transparent inasmuch as the processing unit of a given machine accesses the external memory unit through the access device, as if the external memory were actually part of the internal memory of the machine. In other words, for machine 2, processing unit 21 accesses internal memory 22 and external memory unit 6, in the same way.

Several solutions for ensuring this transparency may be used. In a first example, the access device is a PCI card, that maps an area of memory address space, corresponding to the external memory unit; memory is however, not located on the PCI card, but is accessed through the connection to the external memory unit. Thus, the access device has a memory card-like connection for connecting to the processing unit; it further has a driver for receiving requests from the memory-card like connection and forwarding these requests to the fast access connecting means towards the external memory unit.

In a second example, one uses memory type modules, that are plugged on the bus used by the processing unit for accessing the internal memory, e.g. SIMM-like modules. Unlike usual memory modules, the module do not provide access to integrated circuit memories located on the module, but serves as access to the external memory unit; there is simply provided instead of memory ICs a connection to the external memory unit. Again, the access device has a memory module-like connection for connecting to the processing unit through a memory bus, and a driver for receiving requests from the memory module-like connection and forwarding these requests to the fast access connecting means towards the external memory unit.

In both cases, access to the external memory unit is transparent for the processing unit: the access device translates memory addresses accessed by the processing unit into addresses for the external memory unit, and issues requests to the external memory unit. It receives responses from the external memory unit and forwards the response to the processing unit.

Providing each processor with a transparent access to the external memory unit 6 ensures that the processors of the distributed multiprocessing system have the same view of the external memory; in other words, the processors of the distributed multiprocessing system share a same view of their environment—at least as regards the external memory. Thus, as regards the external memory, the distributed multiprocessing system is equivalent to a symmetric multiprocessing system. Mechanisms applied in SMP systems may then be used for sharing information in the system of FIG. 1, through the external memory.

The system of FIG. 1 provides a distinct advantage over SMP systems: fault tolerance may be managed more easily, since it may be taken care in the external memory unit, independently of any of the processing unit of the machines. A solution for making the memory unit fault tolerant is discussed below.

The system of FIG. 1 also provides a distinct advantage over existing DMP systems: information may be shared easily and transparently through the external memory unit. When access speed to the external memory unit is fast, as exemplified above, the operation of the DMP system may also be accelerated, as compared to prior art DMP systems.

The operation of the system of FIG. 1 is the following. From the point of view of a machine—say machine 2—processing unit 21 may access a given memory range, corresponding to a range of memory addresses. Part of the addresses correspond to internal memory 22, and part to external memory unit 6; however, as discussed above, access to external memory 6 through the access device 24 is transparent to the processing unit, so that there is no difference for the processing unit in the operation for accessing internal or external memory. Processing unit thus accesses the internal memory or the external memory access device, by issuing requests to a given address range over the bus.

The external memory access device 24 receives requests on the bus from the processing unit; it picks up requests that correspond to its defined address range—the address range for the external memory; requests are then forwarded by the access device to the external memory unit 6, though the connection to the external unit. If necessary, the result to the request, returned by the memory unit 6, is sent back to the processing unit 21 on the bus. In other words, the access device translates memory accesses originating from the processing unit into access requests that are serviced by the external memory unit, externally of the machine.

One may note here that the access device and the connection from the access device to the external memory unit need not be fault tolerant; indeed, in the distributed multiprocessing system, each of the machines is normally not fault tolerant. This makes it possible to realize the access device at reduced costs.

External memory unit 6 receives memory access requests from the external memory access devices 24, 34, 44 of machines of the distributed multiprocessing system, and serves the requests. The operation of the memory unit is discussed more specifically in reference to FIG. 2; briefly, the requests originating from different machines are serialized and serviced using a memory sub-system. In order to ensure fault-tolerance, the external memory unit is preferably a hardware fault-tolerant unit. It is also an advantageous that the external memory unit be on-line repairable and upgradeable with no degradation of service.

Figure 2:
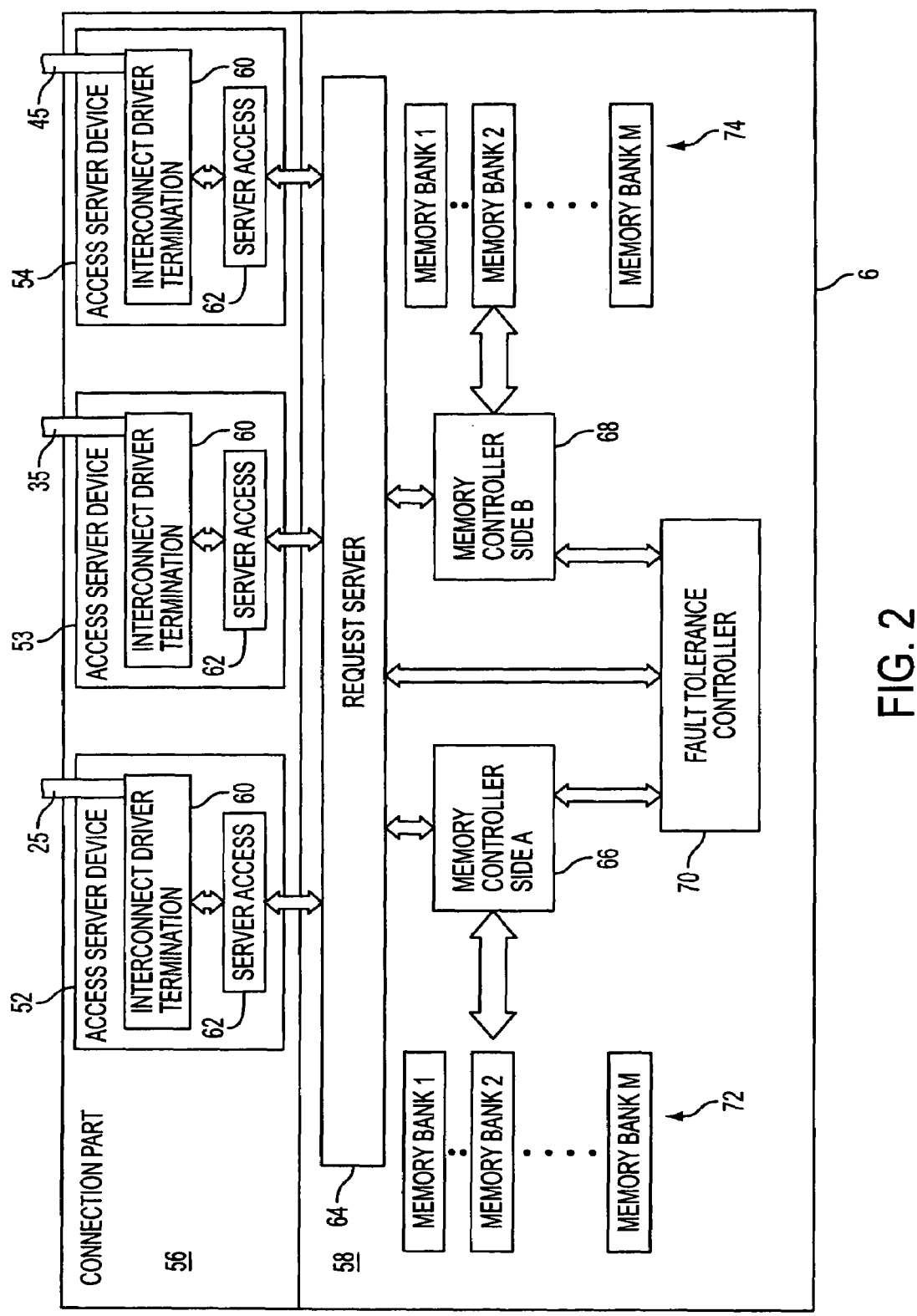
FIG. 2 is a schematic view of the external memory unit of FIG. 1.

FIG. 2 is a schematic view of the external memory unit of FIG. 1. As discussed above, the external memory unit is fault tolerant. It comprises two parts: the first part 56 is a connection part, and the second part 58 a memory part.

The connection part 56 has a series of access server devices 52 to 54; each device is connected to the external memory access device of one machine. A device 52 comprises an interconnect driver termination 60, for receiving and sending signals on the connection 25 to the access device of a machine. It also comprises an server access 62; the server access receives requests from termination 60 and presents it to a request server 64 of the memory part 58 of the external memory unit; the server access further receives from the memory part 58 answers to the requests, and forwards these answers to the driver termination 60 for transmission to the access device of a machine. Thus, an access server device receives requests, presents the requests to the memory part 58 of the unit, and returns the response to the access devices of the various machines. At this point, one should note that the access server devices need not be fault tolerant, since each of the machine is normally not fault tolerant. Hardware failure of an access service device would then simply be considered as a failure of the machine connected to this device, and could be overcome by fault tolerance recovery mechanisms usual in distributed multiprocessing systems.

The memory part 58 of the external memory unit 6 has a request server 64 connected to two memory controllers 66 and 68 and to a fault tolerant controller 70. Each memory controller 66, 68 is connected to a plurality 72, 74 of memory banks. Request server 64, as well as the fault tolerant controller 70 is fault tolerant. Request server 64 receives requests from server access of the different access server devices 52, 53, 54. Requests are serialized and applied to memory controllers 66 and 68. Request server 64 further receives responses from memory controllers 66, 68 and applies the responses to the server access of the relevant access server device 52, 53, 54.

At a given time, one of memory controllers 66 and 68 is active, while the other one is in standby; the active memory controller reads at each cycle one request from the list of requests presented by the request server; it accesses its memory banks and if necessary responds to the request by answering to request server 64. For ensuring update of the standby memory banks, the standby memory controller may also read requests from the list of requests presented by the request server; write requests are executed to update memory banks. In case of read requests, the standby memory controller accesses its standby memory banks. The standby memory controller may then snoop the response applied on the request server by the active memory controller, the standby memory controller may then compare the response of the active memory controller to the contents of its own memory banks. This snooping mechanism makes it possible to synchronize the contents of the memory banks connected to both active and passive memory controllers.

Fault tolerant controller 70 monitors memory controllers 66, 68, and designates one active at start-up of the external memory unit. It monitors error, mismatches, ECC rates and takes faulty units out of service, when necessary.

For synchronizing active and standby memory banks, the fault tolerance controller 70 may also generate pseudo-requests for reading into the memory, e.g. when the request server is idle. When such a pseudo-request is applied by the fault tolerant controller on the request server, it is served by the active memory controller, and the result is snooped by the standby memory controller. If the pseudo-requests are issued by the fault tolerance controller so as to scan the whole range of memory addresses, memory banks may be synchronized after a finite time.

To summarize, memory part 58 of the external memory unit 6 is a fault tolerant memory: it receives requests from the various access server devices of connection part 56, and serves these requests. Since the memory part is fault-tolerant, the memory access unit is a fault tolerant unit—at least as regards the memory accessed by the server devices.

Although the invention has been explained in reference to preferred embodiments, it should be understood that it is not limited to these embodiments, and that various changes or modifications can be contemplated by the person skilled in the art, without departing from the invention, as determined by the appended claims. For instance, in the embodiment of FIG. 1, there is provided one access device in each machine, for accessing a unique external memory unit; one could also contemplate more than one access device in a machine, for accessing more than one external memory unit.

What is claimed is:

1. A distributed multiprocessing system, comprising:
   a fault tolerant external memory unit; and
   at least two hosts connected to a network,
   wherein each host of the distributed multiprocessing system has a processing unit and an internal memory accessed by the processing unit;
   wherein each host further comprises an access device,
   wherein each access device is connected to the external memory unit through a respective memory bus and
   wherein each access device is connected with the internal memory of a respective host so that each access device provides a respective processing unit of a respective host with transparent access to the external memory unit via a respective memory bus.

2. The system of claim 1, wherein each processing unit accesses the external memory unit in a time which is less than three orders of magnitude larger than an access time to the corresponding internal memory.

3. The system of claim 1, wherein access of the external memory by an access device takes place in less than one cycle of the respective memory bus.

4. The system of claim 1, wherein each access device is exclusively connected directly to the external memory by the corresponding memory bus.

5. A distributed multiprocessing system comprising:
   at least two hosts connected to a network, wherein each host has a processing unit and internal memory accessed by the processing unit; and
   a fault tolerant external memory unit, wherein each host further comprises an access device connected to the external memory unit, and the access device provides the processing unit of the host with a transparent access to the external memory unit; and
   wherein the processing unit has an access time to the external memory unit at least two orders of magnitude smaller than an access time to another host through the network.

6. A distributed multiprocessing system, comprising:
   at least two hosts connected to a network, wherein each host of the distributed multiprocessing system has a processing unit and internal memory accessed by the processing unit; and, a fault tolerant external memory unit, wherein each host further comprises an access device connected to the external memory unit, and the access device provides the processing unit of the host with a transparent access to the external memory unit, wherein the access device has a memory-mapped connection to the processing unit and a driver connected to both the memory-mapped connection and the external memory unit.

7. A distributed multiprocessing system, comprising:

at least two hosts connected to a network, wherein each host of the distributed multiprocessing system has a processing unit and internal memory accessed by the processing unit; and, a fault tolerant external memory unit, wherein each host further comprises an access device connected to the external memory unit, and the access device provides the processing unit of the host with a transparent access to the external memory unit, wherein the access device has an internal memory module-like connection connected to the processing unit through a memory bus, and a driver connected to both the internal memory module-like connection and the external memory unit.

8. A distributed multiprocessing system, comprising:

at least two hosts connected to a network, wherein each host of the distributed multiprocessing system has a processing unit and internal memory accessed by the processing unit; and, a fault tolerant external memory unit, wherein each host further comprises an access device connected to the external memory unit, and the access device provides the processing unit of the host with a transparent access to the external memory unit, wherein the external memory unit comprises:

at least two access server devices, each connected to the access device of a host; and, a fault tolerant memory connected to each server device.

9. The system of claim 8, wherein the fault tolerant memory comprises a request server connected to the server devices.

10. The system of claim 9, further comprising:

two memory controllers connected to the request server, wherein each memory controller is connected to one or more memory banks.

* * * * *